J. J. & K. M. STRONG.
Device for Protecting Tables, &c., from Crawling Insects.

No. 233,574.  Patented Oct. 19, 1880.

WITNESSES:
Chas. Niola,
Alex F. Roberts.

INVENTOR:
John J. Strong,
BY Kate M. Strong,
ATTORNEYS.

UNITED STATES PATENT OFFICE.

JOHN JAY STRONG AND KATE M. STRONG, OF TALLADEGA, ALABAMA.

DEVICE FOR PROTECTING TABLES, &c., FROM CRAWLING INSECTS.

SPECIFICATION forming part of Letters Patent No. 233,574, dated October 19, 1880.

Application filed November 29, 1875.

*To all whom it may concern*

Be it known that we, JOHN J. STRONG and KATE M. STRONG, of Talladega, in the county of Talladega and State of Alabama, have invented a new and useful Improvement in Devices for Protecting Tables, &c., from Crawling Insects, of which the following is a specification.

Figure 1:
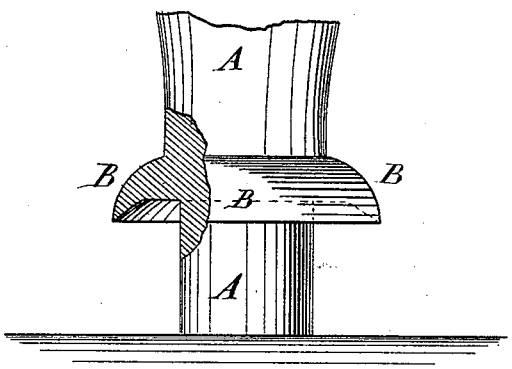
Figure 2:
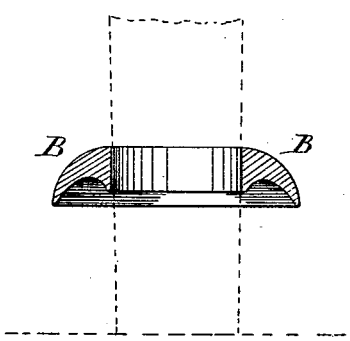
Figure 3:
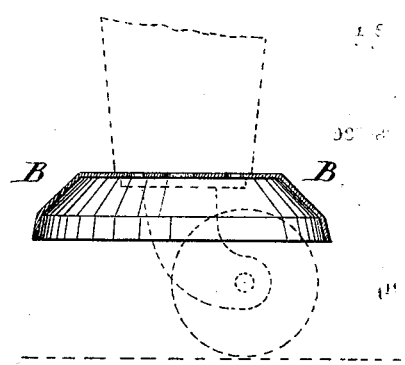

Figure 1 is a side view of our improved device, part being broken away to show the construction. Fig. 2 is a detail cross-section of a modified form of the same. Fig. 3 is a detail cross-section of another modified form of the same.

Similar letters of reference indicate corresponding parts.

The object of this invention is to protect tables and other articles and the substances placed upon them from ants and other crawling insects by means of a simple and effective device applied to the legs or feet of said articles.

Our invention consists in combining with the legs of tables, refrigerators, &c., a flange made concave upon its under side and having a coating of chalk applied thereto.

A represents the leg of a table, shelf, safe, refrigerator, or other article.

B is a flange, which may be of any desired shape or size. The flange B may be made to correspond with the shape or ornamentation of the leg or foot to which it is to be applied, and may be formed solid upon said leg or foot, or may be made separate and attached to said leg or foot, or it may be formed upon or attached to the caster upon which the leg or foot rests.

The flange B may be made of wood, metal, or any other suitable material, and is deeply concaved upon its lower side, as shown in Figs. 1, 2, and 3. The concave surface of the flange B is coated with powdered chalk or other suitable material, which may be made to adhere by first applying to said concave surface, when necessary, a coating of liquid slating or other suitable cement.

With this device, should an insect attempt to crawl over the concave surface of the flange B, the grains of chalk will give way or become detached, thus preventing the further progress of the insect.

Having thus described our invention, we claim as new and desire to secure by Letters Patent—

The improved device, hereinbefore described, for application to legs of tables, refrigerators, &c., the same consisting of the flange B, made concave upon its under side and having a coating of chalk applied thereto, as set forth, for the purpose specified.

JOHN JAY STRONG.
KATE M. STRONG.

Witnesses:
G. W. ANDREWS,
J. P. RICHARDSON.